US007278064B1

(12) United States Patent
Chan

(10) Patent No.: US 7,278,064 B1
(45) Date of Patent: Oct. 2, 2007

(54) INFORMATION DELIVERY SYSTEM

(76) Inventor: Hark C. Chan, 861 Brent Dr., Cupertino, CA (US) 95014

( * ) Notice: Subject to any disclaimer, the term of this patent is extended or adjusted under 35 U.S.C. 154(b) by 550 days.

(21) Appl. No.: 10/771,211

(22) Filed: Feb. 3, 2004

Related U.S. Application Data

(63) Continuation-in-part of application No. 09/846,017, filed on Apr. 30, 2001, now abandoned.

(60) Provisional application No. 60/203,030, filed on May 9, 2000, provisional application No. 60/208,722, filed on Jun. 2, 2000.

(51) Int. Cl.
*G06F 11/00* (2006.01)

(52) U.S. Cl. .......................................... 714/47; 714/48

(58) Field of Classification Search .................. 714/48, 714/47, 49, 57; 370/282
See application file for complete search history.

(56) References Cited

U.S. PATENT DOCUMENTS 5,361,399 A * 11/1994 Linquist et al. .......... 455/412.2
5,539,449 A * 7/1996 Blahut et al. ............... 725/106
5,572,442 A 11/1996 Schulhof et al. ............ 709/219
5,652,783 A * 7/1997 Keba et al. ................. 370/313
5,724,345 A * 3/1998 Guarneri et al. ............ 370/316
5,819,160 A 10/1998 Foladare et al. .............. 455/45
6,078,801 A * 6/2000 Souissi ....................... 455/303
6,130,898 A * 10/2000 Kostreski et al. ........... 370/522
6,259,891 B1 7/2001 Allen ........................ 455/3.02
6,339,693 B1 1/2002 Chan ......................... 455/3.01
6,466,554 B2 10/2002 Okada ......................... 370/12
6,512,919 B2 1/2003 Ogasawara .............. 455/422.1
6,516,466 B1 2/2003 Jackson ....................... 725/62
6,577,860 B1 6/2003 Yoshida ................... 455/412.1
6,614,786 B1 9/2003 Byers ......................... 370/353
2003/0022624 A1 1/2003 Sato .......................... 455/13.1
2003/0060157 A1 3/2003 Henrick ..................... 455/3.04
2003/0134590 A1 7/2003 Suda ......................... 455/3.06

* cited by examiner

*Primary Examiner*—Dieu-Minh Le

(57) ABSTRACT

An apparatus for processing digital data receives a first set of digital data that has a plurality of subsets of digital data. The apparatus contains memory to store the digital data. The apparatus receives a second set of digital data that has a first set of displayable data, a linkage reference and a second set of displayable data. The second set of digital data is used to indicate a presence of the linkage reference. The linkage reference is associated with one of the subsets of digital data. The apparatus determines whether there is error in the subsets of digital data. The apparatus causes a display device to display the second set of displayable data in a first way to indicate that the first linkage reference is active if there is no error and a second way to indicate that the first linkage reference is not active when there is error.

18 Claims, 7 Drawing Sheets

Sophia Chan Painting Exhibition

The California State Library Association is pleased to announce that the Cupertino Art Museum will loan its collection of Sophia Chan's paintings to several California libraries for exhibition to the public. Sophia Chan is one of the most influential painters in the twenty-first century. She created a unique style of painting that has been imitated by many artists. The following is the exhibition schedule:

March 1-20: *Los Angeles Main Library*
April 1-20: *San Francisco Main Library*
May 1-20: *Fresno Main Library*
June 1-20: *San Diego Main Library*

The public is invited.

192

Fig. 3A

Sophia Chan Painting Exhibition¶¶ The ∏California State Library Association∑ba3467∑∏ is pleased to announce that the ∏Cupertino Art Museum∑hp2789∑∏ will loan its collection of Sophia Chan's paintings to several California libraries for exhibition to the public. ∏Sophia Chan ∑we4735∑∏ is one of the most influential painters in the twenty-first century. She created a unique style of painting that has been imitated by many artists. The following is the exhibition schedule: ¶ ∇ E03-21-2000 ∇→March 1-20:→ϒLos Angeles Main Library⌘ba3474⌘ϒ ¶∇∇ E04-21-2000∇→April 1-20: →ϒSan Francisco Main Library ⌘ke9746⌘ ϒ¶∇∇ E05-21-2000∇→May 1-20: →ϒFresno Main Library ⌘tw4872⌘ ϒ¶∇∇ E06-21-2000∇→June 1-20: →ϒSan Diego Main Library ⌘wx5683⌘ϒ ¶∇The public is invited. ¶

194

Fig. 3B

INFORMATION DELIVERY SYSTEM

CROSS-REFERENCE TO RELATED PROVISIONAL APPLICATION

This application is a continuation in part of application Ser. No. 09/846,017 filed Apr. 30, 2001 now abandoned, which claims the benefit of U.S. Provisional Application Ser. No. 60/203,030 filed May 9, 2000 and Ser. No. 60/208,722 filed Jun. 2, 2000. These patent applications are incorporated herein by reference.

FIELD OF THE INVENTION

This invention relates to information delivery, and more specifically to a system and method to deliver encoded information to a plurality of receiving stations.

BACKGROUND OF THE INVENTION

Since the introduction of the World-Wide-Web to the masses in mid-1990, Web browsing has become an important activity of computer-proficient persons. Before installing a web browser in their computers, they have spent a lot of time to learn how to use computers and various software applications. To them, a web browser is just another software application. Thus, the learning hurdle is very low. Using a web browser, they can read web pages posted by people all over the world. As a result, they found web surfing exciting. However, the majority of people are not computer-proficient. They are not willing to spend a significant amount of time to learn about computer hardware and software. Further, they do not see a need to search for information all over the world. All they want is a simple means that allow them to find everyday information easily (i.e., similar to reading newspapers and magazines, watching TVs and listening to radios). Thus, they have no desire to surf the Web.

Another problem of computer-based Internet access is that it is very slow. This is because most computers are connected to the Internet using slow dial-up connections having a maximum speed of 56 kilobits per second. Recently, some homes subscribe to the so-called "broadband" connection that can provide speed of around one million bits per second. However, the actual speed is often limited by the performance of the Internet infrastructure and the servers that host web pages. Further, broadband is available to limited geographic areas, and is often more expensive than dial-up. As a result, it is estimated that less than half of the homes will eventually subscribe to broadband connection.

An information distribution and processing system has been described in U.S. Pat. No. 6,339,693.

What is needed is new information delivery system that is fast and user friendly.

SUMMARY OF THE INVENTION

In the present invention, a large amount of digital data (including text, audio and video data) is broadcasted to a plurality of receiving stations. The receiving stations contains nonvolatile memory to store the data. The data is an enhanced version of the information that can be found in daily newspapers, magazines, radio stations, and video clips. In order to navigate easily this large amount of data, the data contains links to other data stored in the receiving station. Most of the users of the receiving stations do not need to go outside of the stored data to obtain all the information they need. However, to handle those situations where a user needs to access information not stored in the nonvolatile memory, the data also provides links to digital data located outside of the receiving stations.

Each receiver may also contain memory that stores the preferences of users and the history of their actions in using the receiver. A statistical analysis software is used to analyze the information to help the users to conduct searches.

In some cases, the broadcast data may not be received properly due to degradation of broadcast signal. As a result, the data stored in the receiving station may contain errors. The present invention provides a method and system for detecting and correcting such errors.

These and other features and advantages of the present invention are described by the following detailed description of the invention together with the accompanying drawings.

BRIEF DESCRIPTION OF THE DRAWINGS

FIGS. 3A and 3B show the data in an exemplary page of the present invention.

DETAIL DESCRIPTION OF THE INVENTION

The present invention comprises a novel broadcast-based information delivery system and related method. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
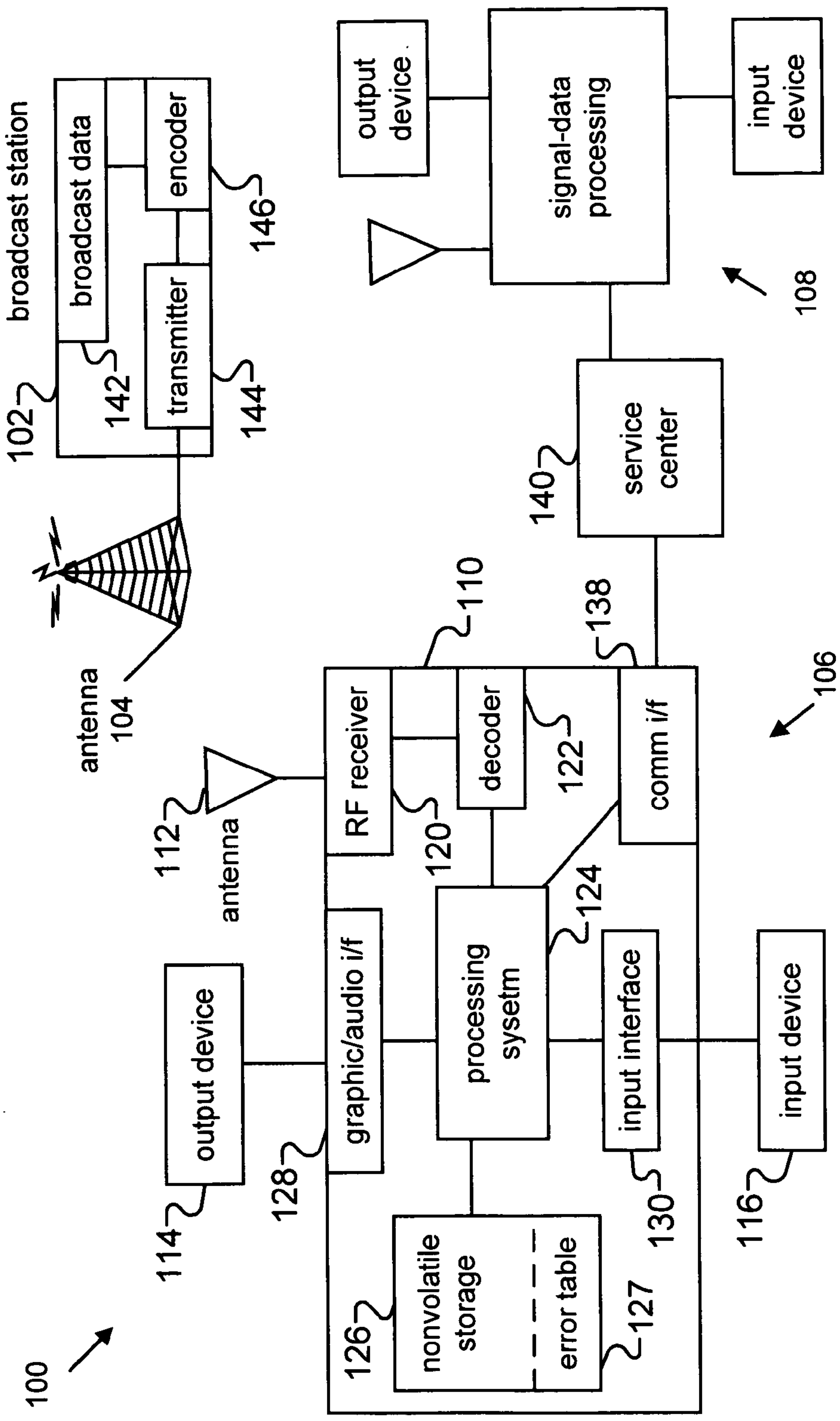
FIG. 1 is a schematic drawing showing a system for broadcast-based information delivery system of the present invention.

FIG. 1 is a drawing showing a system 100 of the present invention. It contains a broadcast station 102 broadcasting radio frequency signals. Broadcast station 102 contains a collection of broadcast data 142, which is encoded into radio frequency signals by an encoder 146. The radio frequency signals are transmitted by a transmitter 144 using an antenna 104. The broadcasted radio frequency signals are received by a plurality of receiving stations, such as station 106 and 108. Because all the receiving stations are substantially the same, only one of them (such as station 106) is described in detail. Receiving station 106 contains a signal-data processing unit 110 that receives the broadcast radio frequency signals using an antenna 112 and processes the digital data contained therein. The processed digital data is changed into audio and/or graphic signals for delivery to an output device 114. Examples of output device are computer monitors, televisions, LCD screens, and loudspeakers. As a result, users can perceive (hear and see) the broadcasted information. Users of receiving station 106 may issue commands to unit 110 using an input device 116. Examples of input device are keyboard, pointing device (e.g., mouse), and remote controller. It should be noted that signal-data processing unit 110, antenna 112, output device 114, and input device 116 may be integrated into a single unit. For example, such a unit can be implemented as a cellular phone having a built-in browser.

In one embodiment of the present invention, broadcast station 102 periodically delivers sufficient information to signal-data processing unit 110 so that most users can find almost all information they need therein. The information is stored in the receiving stations for later retrieving by users. The information includes news, stocks, sports, weather, etc. Video and audio clips can also be delivered. The digital data may contain links so that the users can easily jump to desired parts of the stored information. The digital data is preferably delivered in compressed form to conserve the bandwidth and storage requirements. In some cases, the digital data may be encrypted.

The information may be delivered in small portions at different times. In some cases, transmitter 144 are mainly used for other purposes, and can broadcast information of the present invention when it is not used for its main purpose. However, sufficient bandwidth should be allocated so that the desired amount of information is delivered to the receiving stations within a certain time interval.

Signal-data processing unit 110 contains a radio frequency receiver 120 that tunes to and amplifies the radio frequency signals broadcasted by broadcast station 102. The received radio frequency signals are sent to a decoder 122 for retrieving the digital data embedded into the radio frequency signals. The retrieved digital data is sent to a data processing system 124. Preferably, the digital data is first stored in a nonvolatile memory 126 (such as a hard drive) so that a user can later use the information. Signal-data processing unit 110 contains a graphic/audio interface 128 and an input interface 130. These are hardware and software combinations that interact with the eyes, ears and hands of a user. In one embodiment of the present invention, processing system 124 executes a web browser application that is enhanced to understand the protocol and data structure of the present invention. Processing system 124 can also perform decompression and decryption operations, if the incoming digital data is compressed and encrypted.

In some situation, the user and/or signal-data processing unit 110 may want to interact with a service center 140 (as explained in more detail below). In this case, signal-data processing unit 110 contains a communication interface 138.

The digital data received by receiving station 106 may contain errors introduced by the radio frequency communication. Signal-data processing unit 110 contains an error table 127 to handle this situation, as explained in more details below. Error table 127 is preferably located inside nonvolatile memory 126.

The logical structure of broadcast data 142 is now described. Broadcast data 142 may contain text, image, audio and video data. It is preferably organized into distinct segments each having a separate identification code. In the present disclosure, these segments are referred to as "pages" or "files". In some cases, the structures of these pages and files are similar to conventional web pages and streaming audio/video files. However, in other cases, these pages and files contain enhancements that are not found in conventional web pages and files. In the present disclosure, the words "page" and "file" refer to both cases, unless the context indicates otherwise.

Figure 2:
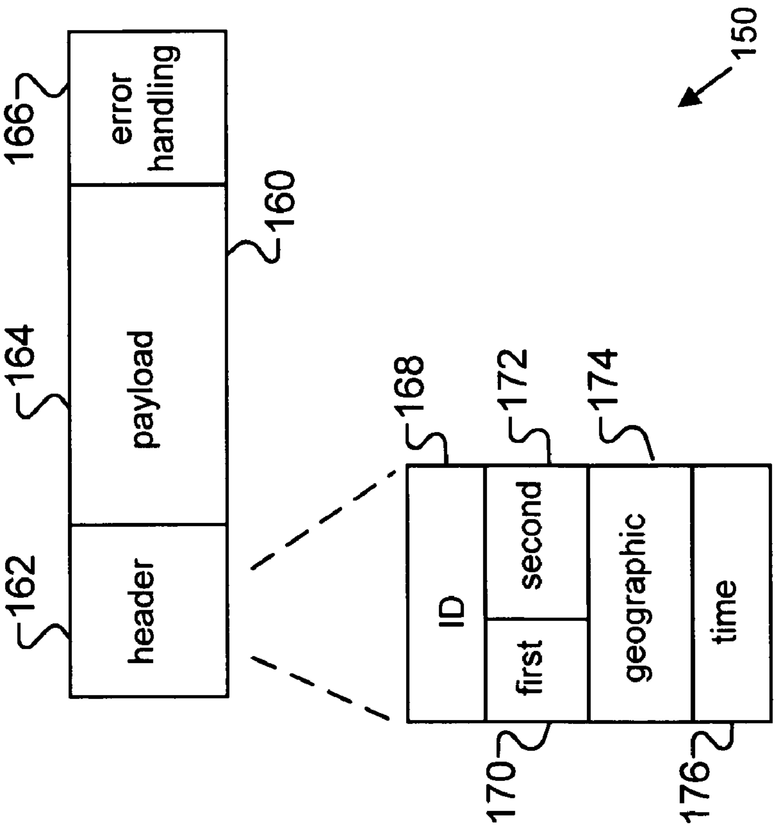
FIG. 2 is a schematic diagram showing the structure of a broadcast data segment of the present invention.

These pages may be linked to each other using their identification codes. FIG. 2 shows the logical structure of an exemplary page 160. It contains a header section 162, a payload section 164 and an error handling section 166. Header section further contains an identification 168, a number of status symbols, such as a first symbol 170 for indicating whether this page is active, a second symbol 172 for indicating how many times this page has been accessed, an optional geographic code 174 and an optional time code 176 for this segment. Other information may be added to header section 162 (e.g., keywords and category information of this page).

Payload section 164 is used to carry the content of a page. Error handling section 166 may contain a simple checksum for error detection. In some cases, it may contain error correction information so that minor errors in the page can be corrected.

It should be noted that the logical structure can be accomplished in different physical implementations. For example, a plurality of data packets of fixed or variable lengths can be used to carry the information of each page.

FIG. 3A shows the content of an exemplary page 192 that is displayed on output device 114 of receiving station 106. FIG. 3B shows a set of data 194 that includes special codes embedded in exemplary page 192 of FIG. 3A. Data 194 is carried by payload 162.

The operation of receiving station 106 in interpreting the embedded code in data 194 is now described. When the code "¶¶" is encountered, processing system 124 interprets it as the title of the page. In this particular example, the title is centered and shown in an enlarged font. One the other hand, a single "¶" is interpreted as a paragraph mark. When processing system 124 encounters digital data (e.g., "California State Library Association") sandwiched by the symbols "Π" and "Σ", the digital data is highlighted in a first way (e.g., underlined using a straight line). This indicates to the user that the words "California State Library Association" is selectable, and the linked page is stored inside his/her own receiving station. The corresponding linkage reference follows the above-mentioned "Σ" symbol, and ends with another "Σ" symbol. This linkage reference allows easy access to the page that can provide additional information about the California State Library Association. In one embodiment, the linkage reference is the same as identification 168 in header section 162 of the page of the California State Library Association. A closing "Π" symbol may also be used to further separate this set of information from the rest of the page. When processing system 124 encounters the "∇" symbol, it interprets the date that is sandwiched with another "∇" symbol as a time related instruction for handling the digital data (e.g., "E03-21-2000") enclosed by another "∇" symbol. In FIG. 3B, the symbol "E" denotes an expiration time (in this example, Mar. 21, 2000). Other symbols can be used to indicate a starting time or a specific time period. Thus, the words "March 1-20: Los Angeles Main Library" will not be displayed after Mar. 21, 2000. The symbol "→" is interpreted to mean indentation. When processing system 124 encounters digital data (e.g., the words "Los Angeles Main Library") sandwiched by the "♈" and "⌘" symbols, the digital data is highlighted in a second way (e.g., in italics). This indicates to the user that the words “Los Angeles Main Library” is selectable, and the linked page is located outside of his/her own receiving station. If the user wishes to retrieve additional information, a connection to service center 140 (or directly to various web sites in the Internet) needs to be available. The corresponding linkage reference is sandwiched between the above-mentioned “⌘” symbol and another “⌘” symbol. A closing “Υ” symbol may optionally be used.

It should be noted that other variations of the embedded codes could be used. For example, in addition to the “∇” symbol (for indicating time related operations), another symbol can be used to design a location code. In this case, selected data will be displayed only in certain geographic area. This is useful when the page is created centrally and delivered over broad geographic areas. For example, a plurality of broadcast stations in many areas can broadcast the same pages, while the information displayed on receiving stations will be different to take into account of time and geographic variations. Other formatting codes in addition to “¶¶”, “¶” and “→” can also be used.

The above described operations, such as parsing of the pages, interpretation of the symbols, handling of the linkage references, searching for pages and data, etc., may be performed using appropriate software modules. These modules may be stored in nonvolatile memory 126, embedded in processing system 124, or a combination.

In one embodiment of the present invention, receiving station 106 is not connected to service center 140. In this case, receiving station 106 receives all the digital data over the air. It is known that communicating digital data over the air may introduce errors. As an example, tall buildings in metropolitan areas could cause the so-called “multipath” interference. Bad weather may also affect the ability to receive radio frequency signals. As a result, the digital data received by receiving station 106 may contain errors.

Figure 4:
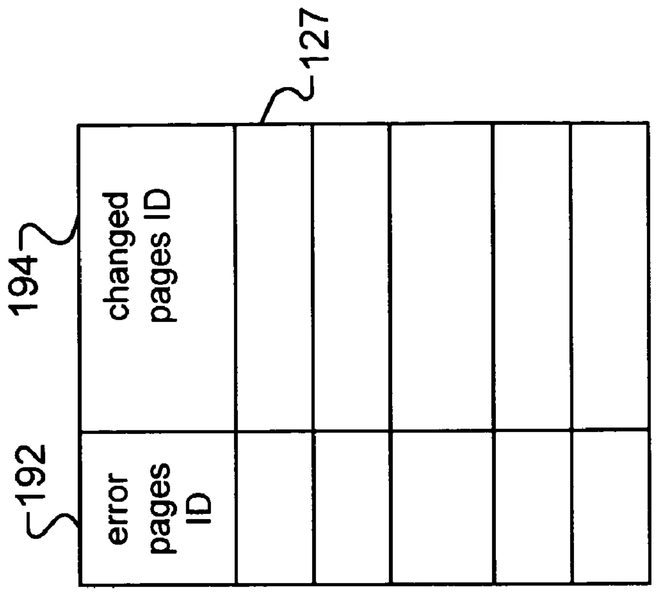
FIG. 4 shows the structure of an error table of the present invention.

Error table 127 of FIG. 1 is used to handle errors. FIG. 4 shows a schematic diagram of error table 127. It contains a column 192 for storing the ID of pages that have errors (called herein the “error page column”). It also contains a column 194 for storing the ID of pages that contain linkage references pointing to these error pages (called herein the “linked page column”).

Figure 5A:
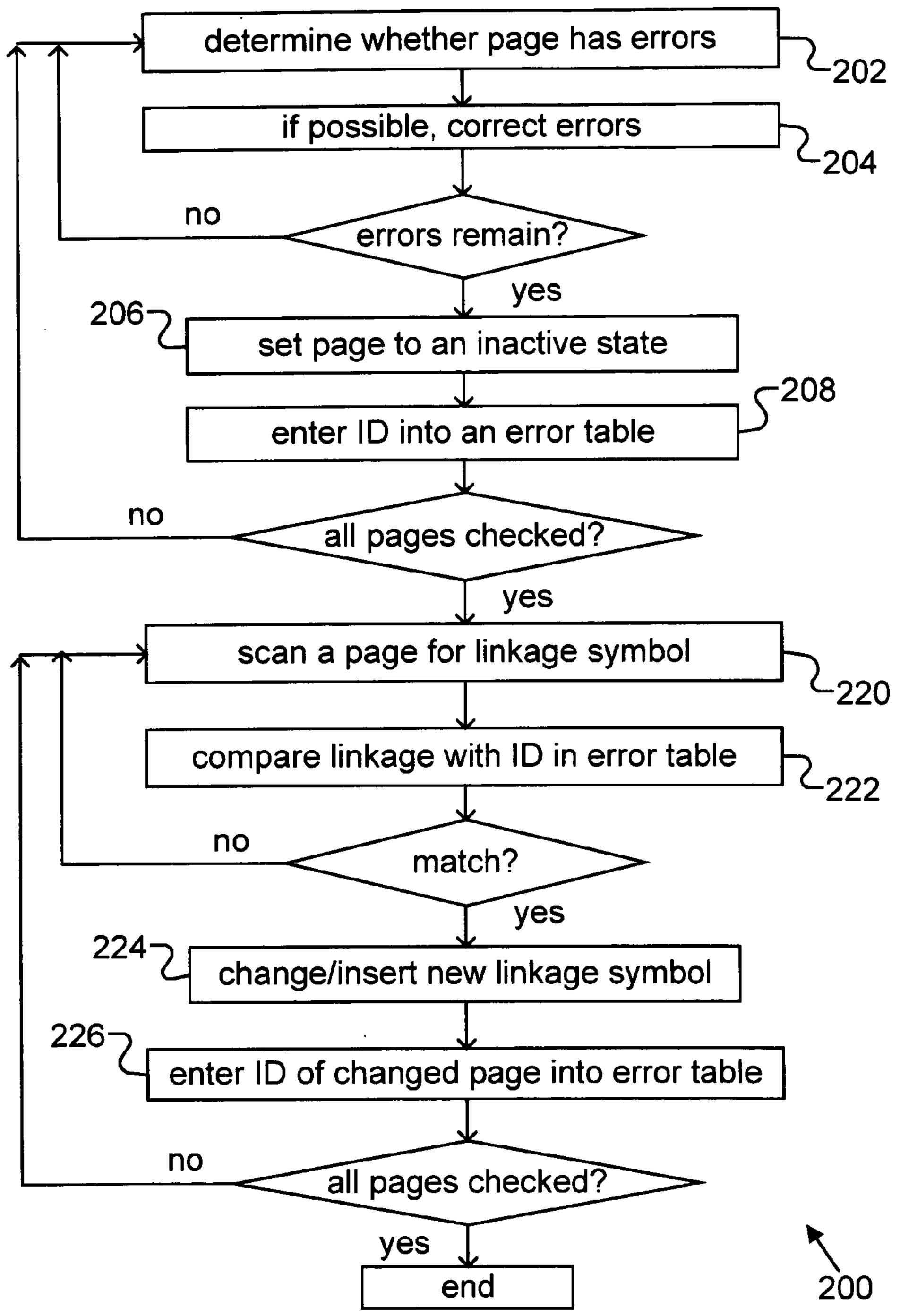
FIG. 5A is a flow chart showing the steps of the present invention for correcting errors when receiving stations are not connected to a service center.

FIG. 5A is a flow chart 200 showing a method of the present invention to handle errors. In step 202, receiving station 106 determines whether a page contains errors. In the present invention, error handling section 166 of page 160 is preferably used to detect and correct errors (step 204). For the situation where errors cannot be corrected, first symbol 170 of header section 162 is set to an inactive state (step 206). The identification 168 of this page is stored in error page column 192 of error table 127 (step 208). The above steps are repeated until all the pages have been checked.

After the error pages have been identified, the next task is to find linkage references that point to these error pages. In step 220, a page is scanned for the “Σ” symbol. This is because this symbol indicates linkage to other pages that are stored in nonvolatile storage 126. The linkage references embedded inside these “Σ” symbols are compared with the identifications stored in the error table (step 222). If there is no match, it indicates that the referenced page does not contain error. Another set of “Σ” symbols is then scanned. If there is a match, a special symbol is inserted into the linkage reference (step 224). Alternatively, the symbol “Σ” is replaced with the special symbol. This symbol informs receiving station 106 that the digital data associated with the linkage reference should not be highlighted. Thus, the users will not expect that additional formation is available. As a result, the user will not select this digital data, and obtain erroneous information. In step 226, the identification of the page having the special symbol is entered into linked page column 194 of error table 127. The above steps in this paragraph are repeated until all the pages have been check.

It can been seen from flow chart 200 that problems relating to errors have been removed. An important aspect is that there is no need for receiving station 106 to contact any outside source to solve the error problem.

Figure 5B:
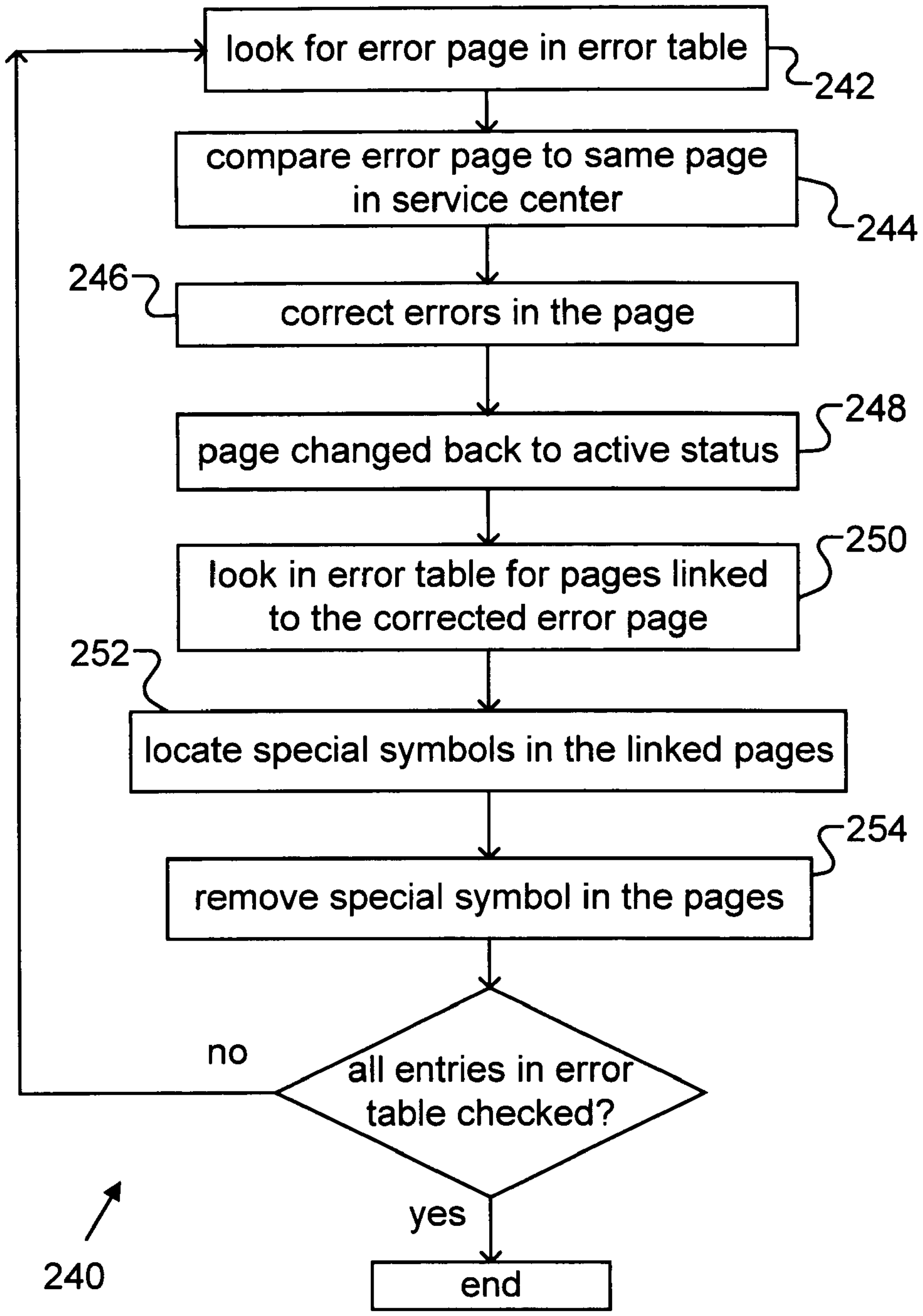
FIG. 5B is a flow chart showing the steps of the present invention for correcting errors when receiving stations are connected to a service center.

In another embodiment of the present invention, service center 140 can be used to correct errors. In this case, the receiving stations periodically access service center 140, or service center 140 periodically accesses the receiving stations, to obtain data to correct the errors. FIG. 5B is a flow chart 240 showing a method of the present invention to correct errors. In step 242, error page column 192 of error table 127 is scanned. If there is an entry in the table, the identification of the page is read. The content of error page is compared to the corresponding page stored in service center 140 (step 244). Any error is corrected (step 246). First symbol 170 in the header section of this page is again set to an active status (step 248). Linked page column 194 of error table 127 is read (step 250). In step 252, the pages referred to in this column (i.e., pages that is linked to the corrected error page) are scanned for the special symbol mentioned in flow chart 200. In step 254, the special symbol is removed. These pages are now restored back to their original form. As a result, receiving station 106 can now highlight the digital data associated with the linkage reference so that users can select it. The above steps are repeated until all the pages in error table 127 are processed.

The above described error detection and correction operations may be performed using appropriate software modules. These modules may be stored in nonvolatile memory 126, embedded in processing system 124, or a combination.

In order to make receiving station 106 easy to use, signal-data processing unit 110 may contain a preference module that is used to keep track of and later predict the preferences of the users. Signal-data processing unit 110 may contains a presentation module that select information to be displayed to users, based, in part, on inputs from the preference module. For example, if a user is finance-oriented (based on the input of the preference module), the screen of the output device will show special buttons that can facilitate financial tasks. Further, advertisements will be focused on financial products.

In some situations, a user may want to search for information in non-volatile storage 126. The user may enter a keyword or other search criteria. Signal-data processing unit 110 may also contain a search module that performs the search. However, most users are not train in doing searches. In many cases, there may be several hundred articles that match the criteria. Users typically do not have the attention span to find the correct information out of these articles. In the present invention, the search module uses the information stored in the preference module to prioritize the articles. The search module presents the articles in the order that matches the interest of the user. As a result, the user can find the information fast.

Figure 6:
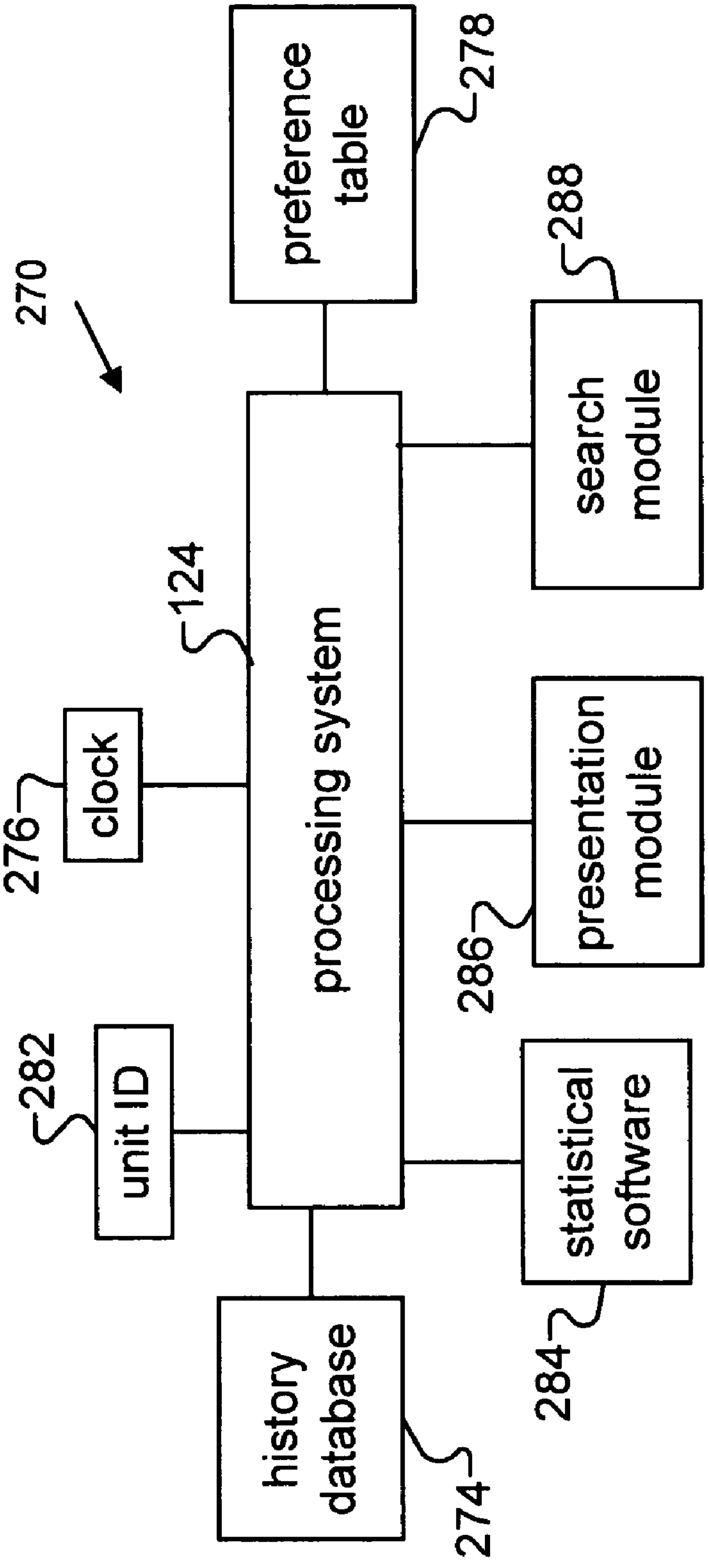
FIG. 6 is a block diagram showing additional structure in the signal-data processing unit of the present invention.

FIG. 6 shows the additional structures 270 that can be added to signal-data processing unit 110. FIG. 6 shows a processing system that is the same as processing system 124 of FIG. 1. A history database 274 is used to store a history of all the buttons and keys that have been pressed by the user. Other relevant information may also be stored. Examples of relevant information include the types of information previously accessed by the user, the typical time of day for using the receiving station, the typical length of time in a browsing session, etc. In one embodiment, data in second symbol 172 (indicating how many times a page has been accessed) and keywords and category information stored in header section 162 of the correspond pages may be stored in history database 274. History database 274 is preferably stored in nonvolatile memory 126 of signal-data processing unit 110. Structure 270 contains a real-time clock 276 so as to be able to determine the date and time of various events. Database 274 is preferably set up for data to be handled in a first-in first-out manner. In this way, only the recent activities of the user are used in the determination of user preferences.

In one embodiment of the present invention, structure 270 contains a preference table 278, preferably stored in non-volatile memory 126. The users can enter their preferences into preference table 278 using input device 116. Preferably, the data entry can be performed at any time so that the users can enter their most recent preferences. Table 278 is preferably re-writable so that the users can re-enter the data whenever there are changes in their preferences.

In some situations, it is desirable for broadcast station 102 to enter data to preference table 278. As an example, broadcast station 102 may obtain independent and verified information on the preferences of the users. This information may be more reliable than those entered by the users. In order for broadcast station 102 to enter data, signal-data processing unit 110 needs to be addressable. Signal-data processing unit 110 optionally contains a memory 282 for storing a unit ID. Memory 282 is preferably a read-only memory. Data directed specifically to a receiving station contains an address that is equal to the unit ID of the targeted station. Data received by a receiving station is processed only when the address in the data received from broadcast station 102 matches its unit ID. In this way, signal-data processing unit 110 can receive the preference data and store it in table 278. Broadcast station 102 can re-enter data whenever new information regarding user preference is received. In order to make sure that only authorized broadcast station can enter data into signal-data processing unit 110, a reliable data authentication method needs to be used. Examples of data authentication methods can be found in a book entitled "Applied Cryptography: Protocols, Algorithms, and Source Code in C," published 1994 by John Wiley & Sons, Inc. This book and the references cited therein are incorporated herein by reference.

Structure 270 also contains a statistical analysis software 284 that can analyze the information in the preference table 278 and history database 274. This software is used by processing system 124 to determine the preference of users. Software 284 is preferably stored in nonvolatile and re-writable memory. Whenever there is improvement in the statistical analysis software, broadcast station 102 can update the software.

Structure 270 also shows the above-mentioned presentation module 286 and search module 288.

It should be noted that the present invention is also applicable to information that is delivered by wired connections (e.g., cable and optic fibers).

Figure 7:
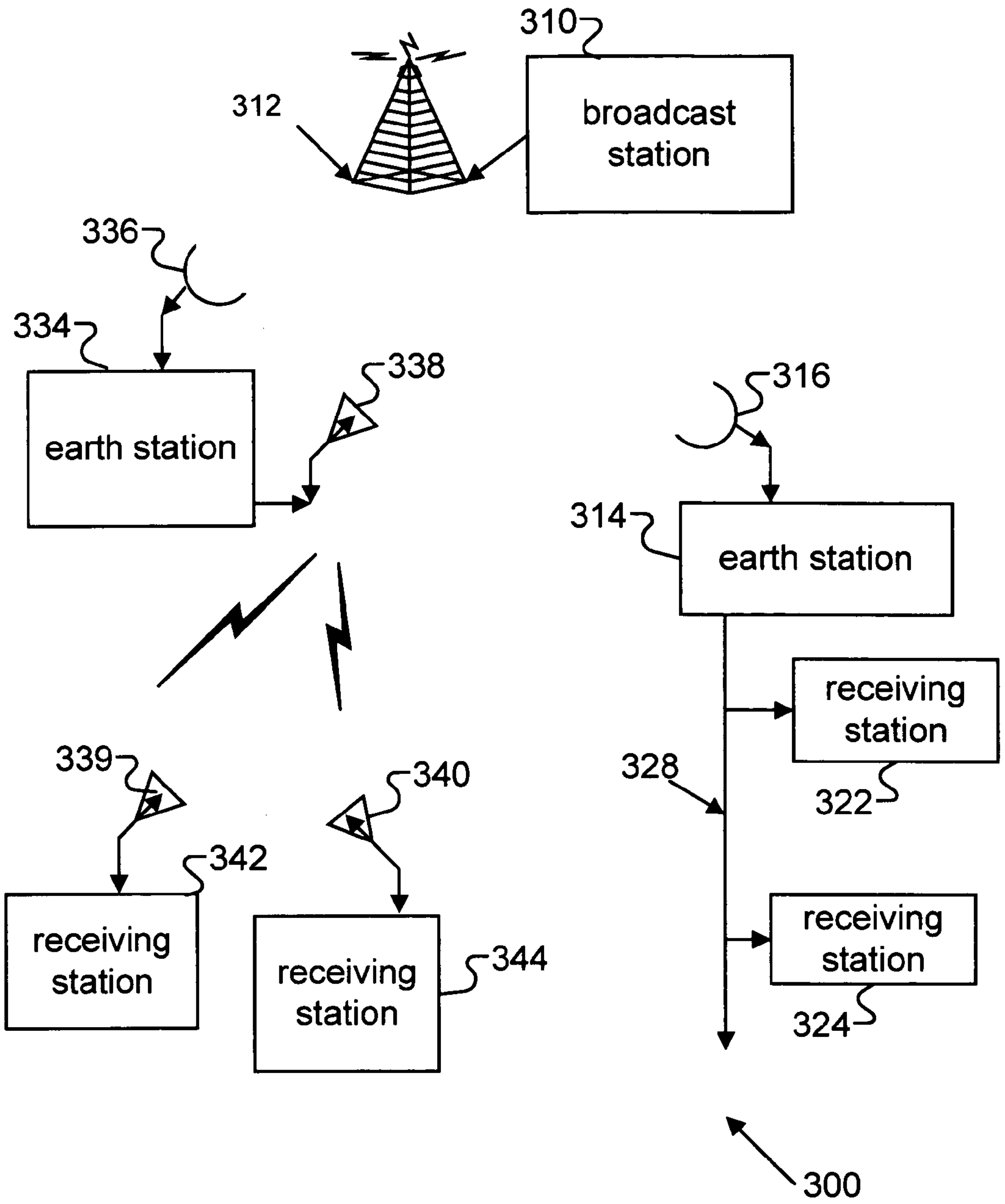
FIG. 7 is a schematic diagram of another embodiment of the present invention.

FIG. 7 shows another embodiment of a system 300 of the present invention. System 300 contains a broadcast station 310, an earth station 314, and a plurality of receiving stations, such as stations 322 and 324. Broadcast station 310 functions in a similar way as broadcast station 102 of FIG. 1 and receiving stations 322 and 324 function in a similar way as receiving stations 106 and 108 of FIG. 1. Broadcast station 310 broadcast radio frequency signals encoded with digital data using an antenna 312. Earth station 314 receives the radio frequency signals using an antenna 316 and retrieves the digital data transmitted by broadcast station 310. The data is distributed to receiving stations 322 and 324 via wired communication channel 328, such as cable and optic fiber. Alternatively, earth station 314 can deliver the received radio frequency signals to receiving stations 322 and 324 via wired communication channel 328. Other earth stations could be placed in strategic locations throughout the country to serve their respective receiving stations in a similar manner as earth station 314 and receiving stations 322 and 324. As a result, a large geographic area can be served simultaneously by broadcast station 310. The advantage of this embodiment is that the equipment costs incurred by the receiving station are low.

In some locations, it may not be desirable to use wired communication channel to link an earth station to subscribers. In such case, wireless communication channel could be used. FIG. 7 shows an earth station 334 that receives radio frequency signals from broadcast station 310 using an antenna 336. Earth station 334 in turn broadcasts the digital data to its receiving stations, such as stations 342 and 344.

In one embodiment of system 300, teletext technology is used to link earth station 334 and stations 342 and 344. Thus, earth station 334 could be located adjacent to a television transmission station. The digital data received by earth station 334 can be integrated to the vertical blanking interval of a TV signal, which is broadcasted using an antenna 338. If the TV signal is a digital TV signal, the digital data can be opportunistically inserted into the digital TV signal. Receiving stations 342 and 344 receive the signal using antennas 339, and 340, respectively. The digital data is then retrieved.

It should be noted that some aspects of the present invention can be implemented independent of radio frequency broadcast. For example, the logical structure of the data and the steps to handle errors in the data can be used outside of radio frequency transmission and broadcasting.

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

I claim:

1. A method for processing data of an apparatus, the method comprising:

receiving a first set of digital data comprising a plurality of subsets of digital data and storing the first set of digital data inside the apparatus;

receiving a second set of digital data comprising a first set of displayable data, a first linkage reference and a second set of displayable data for indicating a presence of the first linkage reference, the first linkage reference allowing easy access to at least one of the subsets of digital data;

determining whether there is error in the at least one of the subsets of digital data;

if there is no error, causing a display device to display the second set of displayable data in a first way to indicate that the at least one of the subsets of digital data is accessible via the first linkage reference; and if there is error, causing the display device to display the second set of displayable data in a second way to indicate that the at least one of the subsets of digital data is not accessible via the first linkage reference.

2. The method of claim 1 wherein the first set of displayable data is displayed in a way that is substantially the same as the second way.

3. The method of claim 1 wherein the first linkage reference is separated from the first or the second sets of displayable data by a third set of digital data.

4. The method of claim 1 wherein the second set of digital data comprises a second linkage reference, the second linkage reference being associated with data in a remote location external to the apparatus.

5. The method of claim 4 wherein the second set of digital data comprises a third set of displayable data for indicating a presence of the second linkage reference.

6. The method of claim 5 wherein the second and the third sets of displayable data are displayed in different ways.

7. The method of claim 1 comprising a step of correcting the at least one of the subsets if it contains error by accessing information in a remote location.

8. A method for processing data of an apparatus, the method comprising:

receiving a first set of digital data comprising a plurality of subsets of digital data and storing the first set of digital data inside the apparatus;

receiving a second set of digital data comprising a first set of displayable data, a first linkage reference and a second set of displayable data for indicating a presence of the first linkage reference, the first linkage reference allowing easy access to at least one of the subsets of digital data;

determining whether there is error in the at least one of the subsets of digital data;

if there is no error, causing a display device to display the second set of displayable data in a first way to indicate that the at least one of the subsets of digital data is accessible via the first linkage reference; and if there is error, causing the display device to display the second set of displayable data in a second way to indicate that the at least one of the subsets of digital data is not accessible via the first linkage reference;

wherein the plurality of subsets each is associated with an identification, wherein the determining includes identifying the identifications that are associated with the subsets that contain errors, and wherein the causing step for the case of error in the at least one of the subsets comprises:

scanning the second set of digital data for the first linkage reference;

determining whether the first linkage reference is associated with one of the identified identifications, and causing the display device to display the second set of displayable data in the second way if the first linkage reference is associated with one of the identified identifications.

9. The method of claim 8 wherein the first set of displayable data is displayed in a way that is substantially the same as the second way.

10. The method of claim 8 wherein the second set of digital data comprises a code for indicating a presence of the first linkage reference, and the scanning comprises searching for the code.

11. The method of claim 8 wherein the second set of digital data comprises a second linkage reference, the second linkage reference being associated with information in a remote location external to the apparatus.

12. The method of claim 10 wherein the second set of digital data comprises a third set of displayable data for indicating a presence of the second linkage reference.

13. The method of claim 12 wherein the second and the third sets of displayable data are displayed in different ways.

14. A method for processing data of an apparatus, the method comprising:

receiving a first set of digital data comprising a plurality of subsets of digital data and storing the first set of digital data inside the apparatus;

receiving a second set of digital data comprising a first set of displayable data, a first linkage reference and a second set of displayable data for indicating a presence of the first linkage reference, the first linkage reference allowing easy access to at least one of the subsets of digital data;

determining whether there is error in the at least one of the subsets of digital data;

if there is no error, causing a display device to display the second set of displayable data in a first way to indicate that the at least one of the subsets of digital data is accessible via the first linkage reference;

if there is error, causing the display device to display the second set of displayable data in a second way to indicate that the at least one of the subsets of digital data is not accessible via the first linkage reference; and correcting the at least one of the subsets if it contains error by accessing information in a remote location;

wherein the plurality of subsets each is associated with an identification, wherein the determining includes identifying the identifications that are associated with the subsets that contain errors, the method further comprising, after the correcting the at least one of the subsets:

scanning the second set of digital data for the first linkage reference;

determining whether the first linkage reference is associated with the corrected subset; and causing the display device to display the second set of displayable data in the first way if the first linkage reference is associated with the corrected subset.

15. The method of claim 14 wherein the second set of digital data comprises a code for indicating a presence of the first linkage reference, and the scanning comprises searching for the code.

16. The method of claim 14 wherein the second set of digital data comprises a second linkage reference, the second linkage reference being associated with information in a remote location external to the apparatus.

17. The method of claim 16 wherein the second set of digital data comprises a third set of displayable data for indicating a presence of the second linkage reference.

18. The method of claim 17 wherein the second and the third sets of displayable data are displayed in different ways.

* * * * *